United States Patent [19]
Buechner et al.

[11] 4,026,854
[45] May 31, 1977

[54] MOLDING COMPOSITIONS BASED ON BITUMEN AND OLEFIN COPOLYMERS

[75] Inventors: Oskar Buechner, Ludwigshafen, Germany; Leo Unterstenhoefer, deceased, late of Limburgerhof, Germany, by Ilse Unterstenhoefer, authorized representative of the heirs; Heinz Mueller-Tamm; Wolfram Rainer Kroll, both of Ludwigshafen, Germany

[73] Assignee: BASF Aktiengesellschaft, Ludwigshafen, Germany

[22] Filed: June 6, 1975

[21] Appl. No.: 584,373

[30] Foreign Application Priority Data

Dec. 29, 1976 Germany .......................... 2435753

[52] U.S. Cl. ................. 260/28.5 AS; 260/28.5 AV; 260/31.8 PQ
[51] Int. Cl.² ........................................ C08L 95/00

[58] Field of Search ............ 260/28.5 AV, 28.5 AS, 260/31.8 PQ, 31.8 PO

[56] References Cited

UNITED STATES PATENTS

| | | | |
|---|---|---|---|
| 3,249,567 | 5/1966 | Vigneault | 260/28.5 AV |
| 3,308,086 | 3/1967 | Wartman | 260/31.8 PQ |
| 3,336,252 | 8/1967 | Raichle et al. | 260/28.5 AV |
| 3,368,989 | 2/1968 | Wissinger et al. | 260/28.5 AV X |

*Primary Examiner*—Lewis T. Jacobs
*Attorney, Agent, or Firm*—Keil, Thompson & Shurtleff

[57] ABSTRACT

Non-tacky molding compositions containing mixtures of bitumen, olefin copolymers and substituted aromatic compounds having at least one functional group, such as dimethyl terephthalate and phthalonitrile. Molding compositions comprising the mixtures of the invention are suitable for use as anticorrosive coatings for the manufacture of elastic non-corrosive bandages for pipelines or for the manufacture of roofing materials.

2 Claims, No Drawings

MOLDING COMPOSITIONS BASED ON BITUMEN AND OLEFIN COPOLYMERS

The present invention relates to non-tacky molding compositions comprising mixtures of bitumen, olefin copolymers and substituted aromatic compounds having at least one functional group.

Molding compositions containing bitumen and olefin copolymers are known, for example, from Belgian Pat. No. 675,892. Shaped articles made from these molding compositions have a number of advantageous properties, but they suffer from the drawback that the granules tend to agglomerate on storage and become difficult to handle.

Attempts have been made to prevent agglomeration of granules by dusting them with fine parting agent powders, for example talcum, chalk and quartz. The use of these parting agents has its disadvantages and, moreover, they fail to show the desired effect to a satisfactory degree.

It is an object of the invention to provide compositions of matter comprising bitumen and olefin copolymers which, in granulated form, remain free-flowing and thus easily processable after storage. The mechanical properties of shaped articles made from such compositions should be comparable with those of the conventional molding compositions of bitumen and olefin polymers.

We have found that this object is achieved by adding to said compositions of matter, which comprise from 10 to 90 parts by weight of bitumen and from 90 to 10 parts by weight of an olefin copolymer, from 0.1 to 10 and preferably from 1 to 4 parts by weight of a substituted aromatic compound of the general formula (I)

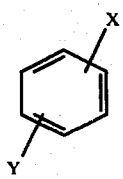

I in which X and Y each is COOH, COOR, CN, or OH, Y may also be hydrogen, or X and Y together form a ring of the grouping —CO—O—CO—.

Preferred compounds of formula I have melting points above 100° C and are bifunctional, i.e. X and Y are functional groups such as COOH, COOCH$_3$, CN and OH. Representatives of this class of substances are, for example, dimethyl terephthalate, phthalonitrile, phthalic acid, phthalic anhydride and benzoic acid.

Suitable bitumens for the mixtures of the invention are those having a penetration of from 1 to 200 according to DIN 1955 and having a softening point (ring and ball) of from 140° to 40° C. However, it is also possible to use any of the commercial natural or synthetic bitumens or asphalt or tar.

By olefin copolymers we mean copolymers of ethylene, propylene, isobutylene or butene-1, which contain ester groups. Particularly suitable copolymers are those of ethylene with vinyl esters of a C$_{2-3}$ alkanoic acid and/or a C$_{1-18}$ alkyl ester of a C$_{3-4}$ alkenoic acid, which copolymers should contain at least 50% and not more than 97%, by weight, of polymerized units of ethylene.

Particularly suitable are the copolymers of ethylene with n-butyl, isobutyl or t.-butyl acrylate or methacrylate or with vinyl acetate. It is also possible to produce molding compositions containing bitumen and mixtures of said olefin copolymers, for example a mixture of polyethylene with copolymers of ethylene and t.-butyl acrylate or vinyl acetate. In some special applications of the mixtures of the invention use may also be made of terpolymers, e.g. terpolymers of ethylene, an acrylate and acrylic acid. In this case the ethylene copolymers contain from 0.1 to 7% molar and preferably from 0.2 to 5% molar of unsaturated carboxylic acid.

To vary the mechanical properties of the molding compositions, the mixtures of bitumen, olefin copolymers and anti-tack additive may be blended with fillers such as slate flour, limestone flour gypsum, chalk, calcium silicate, talcum, asbestos, glass powder, stone wool, slag wool, alumina, dolomite powder, stone dust, titanium dioxide or even organic fillers such as saw dust and cork dust.

The mixtures of the invention are prepared by blending the components in conventional plastics-processing equipment at temperatures of from 100° to 300° C. The order of addition of the ingredients to the mixture is of no importance. For example, the olefin copolymer may be homogenized with bitumen in a kneader, whereupon the anti-tack additive and conventional additives, if used, are added. Alternatively, a homogenous mixture may be formed from bitumen, anti-tack additive and, optionally, conventional additives, to which the olefin copolymer is subsequently added. The mixtures may be processed in conventional manner, for example in extruders, injection molding machines and presses, to form shaped articles.

Surprisingly, the mixtures of the invention comprising bitumen, olefin copolymer and the additive of formula I remain free-flowing after storage over several months. As is shown by Examples 1(a) to 1(d) and Example 2 below, the physical properties of these mixtures having a low additive content are similar to those of molding compositions containing no additive.

The tack-reducing effect of the additives is not restricted to molding compositions which have been converted to granules but also applies to panels and shaped articles of all kinds.

Molding compositions comprising the mixtures of the invention are suitable for use as corrosion protectants for all types of articles and for the manufacture of elastic anti-corrosive bandages for pipes. They are particularly suitable for the manufacture of roofing materials laminated with glass mats. They may also be used in a finely divided state for the manufacture of coatings by the fluidized bed coating and flame-spraying methods. The mixtures of the invention are also used in building construction and civil engineering.

In the following Examples the parts are by weight.

EXAMPLE 1

A copolymer of 82% of ethylene and 18% of n-butyl acrylate is melted with bitumen having a softening point of 40° C and a penetration of 80 in a kneader at 190° C, whereupon the mixture is homogenized. The proportions of dimethyl terephthalate given in Tables 1a to 1d are then uniformly mixed with this mixture. The resulting homogeneous mixture is then extruded to form panels measuring 120 × 120 × 0.5 mm. These panels are stored for 7 days away from dust and their tensile strength and elongation at break are then measured according to DIN 53,455.

To test the tackiness of the material, the panels are halved and the halves are laid one on the other and subjected to a load of 20 kg for 30 minutes at room temperature. The specimens thus pretreated were cut up into three strips having a width of 15 mm and a length of 120 mm. The strips were then peeled apart in a tensometer (by Zwick, model 7826) at a rate of 100 mm/min, the force range being 200 g. The force required to peel the layers apart (the average of three tests in each case) is taken as the measure of tack.

TABLE 1

Mixtures of bitumen, ethylene-n-butyl acrylate copolymer and dimethyl terephthalate

|  | a | b | c | d | no additive |
|---|---|---|---|---|---|
| Copolymer of 82% of ethylene and 18% of n-butyl acrylate (parts w/w) | 47.5 | 48 | 49 | 49.5 | 50 |
| Bitumen (parts w/w) | 50 | 50 | 50 | 50 | 50 |
| Dimethyl terephthalate (parts w/w) | 2.5 | 2.0 | 1.0 | 0.5 | — |
| Tack (g) | 0 | 0 | 1-2 | 5 | 8-9 |
| Tensile strength at break according to DIN 53,455 (kg/cm$^2$) | 43 | 42 | 41 | 42 | 47 |
| Elongation at break (%) | 740 | 740 | 690 | 750 | 720 |

When the content of dimethyl terephthalate in the panels reaches 2.0% w/w, the surface thereof is no longer tacky. As may be seen from the Comparative example given in the last column of Table 1 above, panels consisting of 50% of bitumen and 50% of copolymer are tacky.

EXAMPLE 2

A copolymer of 82% of ethylene and 18% of n-butyl acrylate is melted in a kneader at 190° C with a B 80 bitumen and the mixture is homogenized as in Example 1. The additives listed in Table 2 below are then uniformly mixed in. The mixtures are then converted to panels and tested as in Example 1.

The results are listed in Table 2 below. They show reduction or elimination of tack depending on the additive used.

TABLE 2

Mixtures containing various mono- and bi-functional aromatic additives

|  | Phthalo-nitrile | Phthalo-nitrile | Phthalic acid | Phthalic anhydride | Benzoic acid | No additive |
|---|---|---|---|---|---|---|
| Copolymer of 82% of ethylene and 18% of n-butyl acrylate (parts w/w) | 48 | 49 | 47.5 | 47.5 | 47.5 | 50 |
| Bitumen | 50 | 50 | 50 | 50 | 50 | 50 |
| Additive (parts w/w) | 2 | 1 | 2.5 | 2.5 | 2.5 | — |
| Tack (g) | 0 | 0 | 6 | 0 | 5 | 9 |
| Tensile strength at break (kg/cm$^2$) according to DIN 53,455 | 47 | 46 | 32 | 38 | 45 | 50 |
| Elongation at break (%) | 780 | 780 | 570 | 680 | 810 | 760 |
| MFI (325 g/190° C) | 2.3 | 1.8 | 2.4 | 2.3 | 2.8 | 2.0 |

EXAMPLE 3

A copolymer of 82% of ethylene and 18% of n-butyl acrylate (48.75 parts by weight) was kneaded with a B 80 bitumen (48.75 parts by weight) and dimethyl terephthalate as additive (2.5 parts by weight) in a commercial kneader and then converted to granules under water. The resulting granules were free-flowing both immediately and after a relatively long period of storage and the resulting molding compositions showed useful physical data as follows: melt index 4.45, tensile strength at break 54 kg/cm$^2$, elongation at break 890%, bitumen content 49% by weight.

The material could be satisfactorily processed to sheeting also showing a reduced tendency to stick.

For comparison, a mixture of the same copolymer and bitumen but without the anti-tack additive was then prepared in the same apparatus and converted to granules in the same manner. The resulting material was tacky immediately after granulation and was no longer free-flowing after storage for 1 day.

We claim:
1. Non-tacky molding compositions comprising
   a. from 10 to 90 parts by weight of bitumen,
   b. from 90 to 10 parts by weight of a copolymer of an olefin and an olefinically unsaturated carboxylic ester,
   c. from 0.1 to 10 parts by weight of a substituted aromatic compound selected from the group consisting of dimethyl terephthalate, phthalonitrile, phthalic acid, phthalic anhydride, and benzoic acid.
2. Non-tacky molding compositions as set forth in claim 1 wherein component (c) consists of from 1 to 4% by weight of dimethyl terephthalate.

* * * * *

UNITED STATES PATENT AND TRADEMARK OFFICE
CERTIFICATE OF CORRECTION

PATENT NO. : 4,026,854
DATED : May 31, 1977
INVENTOR(S) : Oskar Buechner et al

It is certified that error appears in the above-identified patent and that said Letters Patent are hereby corrected as shown below:

First page, left-hand column, Foreign Application Priority Data should read --July 25, 1974--.

*Signed and Sealed this*

*Twenty-seventh* Day of *June 1978*

[SEAL]

Attest:

RUTH C. MASON
*Attesting Officer*

DONALD W. BANNER
*Commissioner of Patents and Trademarks*